Feb. 27, 1968

R. L. JAMES ET AL 3,371,259

ON-OFF DIRECT CURRENT MOTOR CONTROL NETWORK
WITH DYNAMIC BRAKING
Filed May 26, 1965

INVENTORS
ROBERT L. JAMES
MICHAEL T. KRIVAK
BY *Herbert L. Davis*
ATTORNEY

United States Patent Office 3,371,259
Patented Feb. 27, 1968

3,371,259
ON-OFF DIRECT CURRENT MOTOR CONTROL NETWORK WITH DYNAMIC BRAKING
Robert L. James, Bloomfield, and Michael T. Krivak, Woodridge, N.J., assignors to The Bendix Corporation, Teterboro, N.J., a corporation of Delaware
Filed May 26, 1965, Ser. No. 458,893
4 Claims. (Cl. 318—380)

ABSTRACT OF THE DISCLOSURE

A solid state bridge control network having opposite transistor arms to supply on-off reversible direct current power to a direct current motor armature winding. Unidirectional current flow control means are connected to terminals of brushes of the motor and in relation to a direct current source so that the unidirectional current flow control means is conductive only upon transient energy and back electromotive force being present after current flow to the armature winding is effected and then suddenly stopped. The unidirectional current flow control means provide low resistance paths to dissipate the transient energy and in an opposite sense to dissipate back electromotive force producing a torque opposing motion of the motor armature by effective dynamic braking.

---

This invention relates to an on-off direct current motor control network with dynamic braking and, more particularly, to a novel electronic control network to supply an on-off reversible direct current power to an armature winding of a direct current motor in accordance with a direct current input signal and which network is so arranged that in the absence of a signal input a very low resistance appears across terminals of the armature winding to provide dynamic braking of the motor.

The subject direct current servo motor control network may be of a solid state type having lower signal current requirements and advantages of less size and weight with greater reliability of operation than the conventional relay type servo control systems heretofore used. The type of control circuit provided in the present invention permits the subject servo control system to be packaged with integrated circuit techniques well known in the present state-of-the-art of integrated circuit packaging so as to afford even greater advantages in size, weight, reliability, and cost of manufacture.

An object of the invention is to provide a novel D.C. motor control network including a novel bridge circuit arrangement for controlling diagonally opposite transistor arms of the bridge circuit and thereby the sense of a bridge output current applied through the bridge circuit to a control winding of the motor.

Another object of the invention is to provide a novel transistorized control circuit for a direct current motor including unidirectional current flow control means for effecting a low resistance path across an armature winding of the direct current motor in the absence of an input signal causing operation of the transistorized control circuit so as to effectively reduce electro-magnetic interference generated by the motor.

Another object of the invention is to provide a reversible on-off direct current motor control system including novel means for effecting a dynamic braking of the motor upon the control system being in an off condition.

Another object of the invention is to provide a novel servo motor control network so arranged as to substantially reduce motor generated electro-magnetic interference.

Another object of the invention is to provide a reversible on-off type direct current control system for supplying power to armature winding terminals of a fixed field type direct current motor in which the control system is so arranged that upon termination of a signal input to drive the motor there is effected a low resistance path across the armature winding through a first unidirectional control device acting in a sense to dissipate inductive transient energy arising at the winding terminals, and a second unidirectional control device effective upon the inductive transient energy being dissipated to effect another low resistance path across the armature winding acting in an opposite sense to dissipate remaining back electromotive force producing a torque opposing motion of the motor armature by effective dynamic braking.

These and other object and features of the invention are pointed out in the following description in terms of the embodiment thereof which is shown in the accompanying drawing. It is to be understood, however, that the drawing is for the purpose of illustration only and is not a definition of the limits of the invention. Reference is to be had to the appended claims for this purpose.

The drawing is a schematic wiring diagram of a control network embodying the invention.

Referring to the drawing, the numeral 10 indicates a direct current motor having an armature winding 15 having end terminals suitably operatively connected to armature brushes 17 and 19 from which lead conductors 21 and 23. The conductors 21 and 23 are in turn connected to conductors 25 and 27 of a bridge circuit 30 in which the conductor 25 leads from an emitter element 33 of an NPN type transistor 35 to an emitter element 37 of a PNP type transistor 39 while the conductor 27 leads from an emitter element 41 of an NPN type transistor 43 to an emitter element 45 of a PNP type transistor 47.

A collector element 50 of the transistor 35 is connected by a conductor 52 to a collector element 54 of the transistor 43 while a collector element 56 of the transistor 39 is connected by a conductor 58 to a collector element 60 of a transistor 47. A source of electrical energy or battery 62 has a positive terminal connected by a conductor 64 to the conductor 52 while the negative terminal of the battery 62 is connected by a conductor 66 to a common ground which is in turn connected by a conductor 67 leading from the common ground to the conductor 58 connecting the collector elements 56 and 60 of the PNP type transistors 39 and 47.

The transistors 35, 39, 43 and 47 provide opposite legs of the bridge circuit 30 for controlling energization of the armature winding 15 of the D.C. motor 10.

In effecting a control action of the bridge circuit 30, there is provided an NPN type transistor 71 having a collector element 73 connected by a conductor 75 and resistor element 77 to the conductor 52 while an emitter element 79 of the transistor 71 is connected to the conductor 58. A conductor 81 leads from the conductor 75 to a base element 83 of the NPN type transistor 35 while the collector element 73 of the transistor 71 is connected by a conductor 85 to a cathode element 87 of a diode 90 having an anode element 93 connected by a conductor 95 to a base element 97 of the PNP type transistor 39.

In effecting an additional control action of the bridge circuit 30, there is provided an NPN type transistor 100 having a collector element 103 connected by a conductor 105 and resistor element 107 to the conductor 52 while an emitter element 109 of the transistor 100 is connected to the conductor 58. A conductor 111 leads from the conductor 105 to a base element 113 of the NPN type transistor 43 while the collector element 103 of the transistor 100 is connected by conductor 115 to a cathode element 117 of a diode 120 having an anode element 123 connected by a conductor 125 to a base element 127 of the PNP type transistor 47.

Further, in controlling the action of the bridge circuit 30, the NPN transistor 71 includes a base element 130 connected through a resistor 132 and conductor 134 to a switch contact 136 arranged in cooperative relation in a switching device 138 shown herein as including an operator-operative switch arm 140 connected to the conductor 52 and arranged in cooperative relation with the contact 136. The switching device 138 may of course be of an electronic switching type or other switching means operative by suitable control means.

Similarly, in effecting an opposite control action of the bridge 30, the NPN type transistor 100 may include a base element 150 connected through a resistor 152 and conductor 154 to a switch contact 156 arranged in cooperative relation in a switching device indicated by the numeral 158. The switching device 158 may include an operator-operative switch arm 160 connected to the conductor 52 and arranged in cooperating relation with contact 156. The switching device 158, as in the case of the switching device 138, may be of an electronic switching type or other suitable switching means.

Further, as shown in the schematic wiring diagram, there is provided novel unidirectional current flow control means for effecting a low resistance path across the armature winding 15 of the direct current motor 10. Such means is effected through diodes 170 and 172 in which the diode 170 has a cathode element 174 connected by a conductor 176 to the conductor 52 and an anode element 178 connected by a conductor 180 to the conductor 21 leading from the armature brush or terminal 17 of the armature winding 15.

Further, the diode 172 has a cathode element 184 connected by a conductor 186 to the conductor 52 and an anode element 188 connected by a conductor 190 to the conductor 23 leading to the terminal or armature brush 19 of the armature winding 15 of the direct current motor 10.

As hereinafter explained, the diodes 170 and 172 are so arranged in the control network of the bridge circuit 30 and in relation to the armature winding 15 of the direct current motor 10 as to effectively reduce electro-magnetic interference generated by the motor in providing a first low resistance path across the armature winding 15 so as to dissipate inductive transient energy arising at the terminals 17 and 19 of the armature winding 15 and thereafter effect, upon the inductive transient energy being dissipated, another low resistance path across the armature winding 15 acting in an opposite sense to dissipate remaining back electro-motive force producing an effective dynamic braking or torque opposing motion of the motor armature.

OPERATION

Referring to the schematic wiring diagram of the drawing, the switching devices 138 and 158 are normally in an open circuit position, as shown, whereupon the bridge circuit 30 is in a balanced relation to the armature winding 15 of the D.C. motor 10, since with the switch devices 138 and 158 in open circuit positions a zero bias is applied to the bases of the NPN type transistors 71 and 100. This renders the transistors 71 and 100 non-conductive whereupon a positive bias is applied by the battery 62 through the resistors 77 and 107 to the cathode elements 87 and 117, respectively, of the diodes 90 and 120 which have anode elements 93 and 123 connected to the base elements 97 and 127 of the PNP type transistors 39 and 47. The positive bias thus applied to the cathode element of both diodes 90 and 120 acts to prevent a reverse flow of electrical energy from the base elements through the diodes 90 and 120 and thereby renders non-conductive, of electrical energy, the PNP type transistors 39 and 47 which are of an opposite type from the NPN type transistors 35 and 43. The NPN type transistors 35 and 43 in opposite legs of the bridge circuit 30 act then in balanced opposing relation and are ineffective to pass a flow of current through the armature winding 15 upon both of the PNP type transistors 39 and 47 in the remaining opposing legs of the bridge circuit being biased to a normally non-conductive state.

However, upon one or the other of the switch devices 138 or 158 closing the circuit controlled thereby to apply a positive bias to the base element 130 or 150 of the bridge circuit controlling transistors 71 or 100, the bridge circuit 30 will be unbalanced to direct a flow of current from the battery 62 through the armature winding 15 in one sense or the other to effect rotation of the armature in a clockwise or counterclockwise direction dependent upon the selective closure of the switch device 138 or 158, as hereinafter explained.

Thus, for example, upon closure of the switch device 138 by the operator adjusting switch arm 140 to a position closing contact 136 a positive bias is applied from the battery 62 to the base element 130 of the NPN type control transistor 71 which causes a flow of current from the collector element 73 to the emitter element 79 of the transistor 71. This in turn causes a negative bias to be applied through the conductors 75 and 81 to the base 83 of the NPN type transistor 35 rendering the transistor 35 nonconductive between the collector element 50 and the emitter element 33. Similarly, a negative bias is applied through the conductor 85, diode 90 and conductor 95 to the base element 97 of the transistor 39 which acts to render the PNP type transistor 39 conductive from the emitter element 37 to the collector element 56. Further, the positive bias applied by the battery 62 through the resistor 107 to the base element 113 of the NPN type transistor 43 now renders the transistor 43 conductive of electrical energy from the collector element 54 to the emitter element 41 upon the PNP type transistor 39 being rendered conductive, as heretofore explained, so that there is a flow of electrical energy from the positive terminal of the battery 62 through the conductor 64, conductor 52, collector element 54 and emitter element 41 of the transistor 43, conductor 27, conductor 23, brush 19, armature winding 15, brush 17, conductor 21, conductor 25, emitter element 37 and collector element 56 of the transistor 39 to the conductor 58 leading to the grounded conductor 67 which serves to return the flow of electrical energy to the grounded conductor 66 leading to the negative terminal of the battery 62.

A control current path further exits by way of conductor 25 to emitter element 37 of transistor 39 and thereby through conductor 95 to anode element 93 of the diode 90 and from the cathode element 87 thereof through conductor 85 to the collector element 73 of transistor 71 to the emitter element 79 thereof and thereby to ground. A control current path also exits from the positive terminal of battery 62 through conductor 64 and conductor 52 to switch arm 140 of switch device 138 then through contact 136 and conductor 134, resistor 132 to the base element 130 of the transistor 71 and thence from the emitter element 79 of the transistor 71 to ground.

The effected action then upon the switch arm 140 closing contact 136 produces a full positive voltage on the brush or terminal 19 of the armature winding 15 and a negative bias on the brush or terminal 17 of the armature winding 15. The transistors 35 and 47 remain off at this time, since their base elements 83 and 127, respectively, are biased off by the emitter-base voltage drops of the transistors 39 and 43, respectively.

When the switch device 138 is set in open circuit position as upon the operator adjusting the switch arm 140 out of closing relation to contact 136, the positive bias applied to the base 130 of the transistor 71 is removed and current flow in the transistors of 71, 39 and 43 is interrupted, since the base current in the NPN transistor 71 which controls this action has become zero.

However, an inductive transient voltage at the motor brushes or terminals 17 and 19 now tries to keep the same motor current flowing in the armature winding 15 and does so by driving current from the motor terminal 17 through the conductor 21, conductor 180, diode 170, conductor 176, conductor 52, collector element 54, base element 113, emitter element 41 of the transistor 43 and conductors 27 and 23 to the motor brush or terminal 19.

When this inductive transient voltage has been dissipated, the remaining back electromotive force voltage (applying a positive bias on terminal 19) may due to the speed of rotation of the armature winding 15 of the motor 10 act to drive current through conductor 23, conductor 190, diode 172, conductor 186, conductor 52, to collector element 50, base element 83 and emitter element 33 of the transistor 35 and through conductors 25 and 21 back to the brush or terminal 17 of the motor 10. This last mentioned current is opposite in direction to the previous motor running current and acts to produce a torque-opposing motion of the armature of the motor 10 thus effecting a dynamic braking.

In this latter action, the transistors 39 and 47 are held off during this period of transient discharge and dynamic braking because voltage drops across the base to emitters elements of transistors 35 and 43 and voltage drops across the diodes 170 and 172 cause base to emitter element voltages of transistors 39 and 47 to be either of wrong polarity or else too low in amplitude to cause collector current flow (i.e., below conduction threshold). Further by circuit symmetry, it will be seen that a closure of the contact 156 by switch arm 160 of the switch device 158 by the operator would produce reverse direction of motor rotation. There would be further effected a dynamic braking upon the opening of the switch device 158 in like manner to that of the opening of the switch device 138, as heretofore explained.

It would be seen from the foregoing that there is provided in the present invention a novel bridge circuit arrangement for controlling diagonally opposite transistors 71, 39 and 43, or 100, 47 and 35 of the bridge circuit output state configuration and a novel bridge circuit arrangement for providing a low resistance path through diode 170 or 172 across the armature winding 15 of the D.C. motor 10 in the absence of an input signal and a simplified control circuit for effecting a reversible on-off D.C. servo motor drive with dynamic braking in the case of a single polarity direct current supply.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

We claim:

1. An apparatus for controlling a motor having a control winding comprising, in combination, a normally electrically balanced bridge circuit, a source of direct current, a pair of input conductors leading to said bridge circuit and connected to opposite terminals of said source, a pair of output conductors leading from said bridge circuit, said control winding being operatively connected at opposite ends between said output conductors, a first pair of transistors of opposite conductivity type connected in opposite arms of said bridge circuit and to one of said pair of output conductors, a second pair of transistors of opposite conductivity type connected in other opposite arms of said bridge circuit and to the other of said pair of output conductors, said first and second pair of transistors including transistors of one conductivity type operatively connected to one of said input conductors, and transistors of another conductivity type operatively connected to the other of said input conductors, the transistors of said first and second pairs of transistors each having an emitter, a collector and a base, the emitter of the transistor of the one conductivity type being connected in series with the emitter of the transistor of the other conductivity type, the collectors of said transistors of said first and second pairs being connected across the source of direct current, control means operatively connected across said pair of input conductors, said control means including a pair of control transistors of said other conductivity type, each of said control transistors having a collector, an emitter and a base, a resistor means connecting the collectors of said control transistors to one terminal of the source, the emitter of each of the control transistors being connected to the other terminal of the source, selectively operable switching means for connecting the base of one of the control transistors to the one terminal of the source to bias the base of said one control transistor so as to render the control transistor conductive from the collector to the emitter thereof, means connecting the collector of said one control transistor to the base of each of the transistors of said one pair of transistors, said connecting means including a diode acting in a sense to render the transistor of said one conductivity type of said one pair of transistors conductive upon the base of said one control transistor being biased by the source of direct current through said selectively operable switching means, and said control means selectively controlling the transistor of said one conductivity type in one of said pair of transistors to electrically unbalance said bridge circuit and effect a flow of current from said source through the transistor of said one conductivity type in said one pair of transistors, said other transistor of said other conductivity type in the other of said pair of transistors and through said output conductors and control winding in a direction dependent upon the sense of unbalance of the bridge circuit effected by said control means.

2. The combination defined by claim 1 including a first unidirectional current flow control device operatively connecting said one output conductor and thereby one end of the control winding to the collector of the transistor of said other conductivity type in said second pair of transistors, said first control device upon a rebalancing of the bridge circuit being conductive to dissipate inductive transient energy arising at terminals of the control winding and acting in one sense, a second unidirectional current flow control device operatively connecting said other output conductor and thereby another end of the control winding to the collector of the transistor of said other conductivity type in said first pair of transistors, said second control device upon a rebalancing of the bridge circuit being conductive to dissipate inductive transient energy arising at terminals of the control winding and acting in an opposite sense, and said first and second control devices thereby coacting to effect a dynamic braking of the motor upon the rebalancing of the bridge circuit.

3. In a direct current motor control network of a type including a motor having an armature winding for controlling direction of rotation of the motor; the combination comprising a normally electrically balanced bridge circuit, a source of direct current having a positive terminal and a negative terminal, a pair of input conductors for said bridge circuit, one of said input conductors being connected to the positive terminal and the other of said input conductors being connected to the negative terminal of said source, a pair of output conductors leading from said bridge circuit to opposite terminals of said armature winding, a first pair of transistors including an NPN type transistor and a PNP type transistor connected in opposite arms of said bridge circuit, a second pair of transistors including an NPN type transistor and a PNP type transistor connected in other opposite arms of said bridge circuit, the transitsors of said first and second pair of transistors each having an emitter, a collector and a base, the emitter of the NPN type transistor in each of said pair of transistors being connected in series with the emitter of the PNP type transistor in the corresponding pair of transistors, the emitters of the first pair of transistors being connected to one of said pair of output conductors leading from said bridge circuit, the emitters of the second pair of transistors being connected to the other of said pair of output conductors leading from said bridge circuit, the collectors of said NPN type transistors in each of said pair of transistors being connected to the positive terminal of said source of direct current, the collectors of said PNP type transistors in each of said pair of transistors being connected to the negative terminal of said source of direct current, a first control means for said first pair of transistors, a second control means for said second pair of transistors, each of said control means including a control transistor of said NPN type, each of said control transistors having a collector, an emitter and a base, each of said control means including a resistor connecting the collector of the control transistor thereof to the positive terminal of the source of direct current, the emitter of the control transistor of each control means being connected to the negative terminal of the source, each control means including a switching means operable in one sense to connect the base of the control transistor thereof to the positive terminal of the source of direct current and in another sense to disconnect the last mentioned base from said source, said switching means being operable in said one sense to cause said source to bias the base of such control transistor so as to render such control transistor conductive from the collector to the emitter thereof, means connecting the collector of the control transistor of each of the first and second control means to the base of the NPN type transistor of the corresponding pair of transistors controlled thereby, each of the control transistors including a diode having a cathode element connected to the collector of such control transistor and an anode element connected to the base of the PNP type transistor of the corresponding pair of transistors controlled thereby, said diode acting in a sense to conduct a flow of electrical energy from the base of such PNP type transistor to the collector of the control transistor to render the PNP type transistor conductive, such conductive action of the diode being rendered effective upon one of said switching means being operated in the one sense so as to cause the base of the corresponding control transistor to be biased by the source of direct current to thereupon electrically unbalance the bridge and effect a flow of current from said source through the PNP type transistor of one of said pair of transistors and the NPN type transistor of the said other pair of transistors and thereby through said output conductors and armature winding in a direction dependent on the sense of unbalance of the bridge circuit effected by a selective operation of the switching means of said first and second control means.

4. The combination defined by claim 3 including a first unidirectional current flow control diode effective upon a rebalancing of the bridge circuit for operatively connecting one end of the armature winding to the collector of the NPN type transistor in one of said pair of transistors, said first control diode being conductive to dissipate inductive transient energy arising at terminals of the armature winding and acting in one sense, a second unidirectional current flow control diode effective upon the rebalancing of the bridge circuit for operatively connecting another end of the armature winding to the collector of the NPN type transistors in the other of said pair of transistors, said second control diode being conductive to dissipate inductive transient energy arising at terminals of the armature winding and acting in an opposite sense, and said first and second diodes coacting to effect dynamic braking of the motor upon the rebalancing of the bridge circuit.

References Cited

UNITED STATES PATENTS

| | | | |
|---|---|---|---|
| 2,965,827 | 12/1960 | Hohne | 318—380 |
| 3,143,695 | 8/1964 | Hohne et al. | 318—345 X |
| 3,233,161 | 2/1966 | Sikorra | 318—345 X |

ORIS L. RADER, *Primary Examiner.*

J. J. BAKER, *Assistant Examiner.*